April 20, 1937.  O. E. FISHBURN ET AL  2,077,553
DOUBLE CLUTCH TRANSMISSION
Filed Dec. 27, 1932
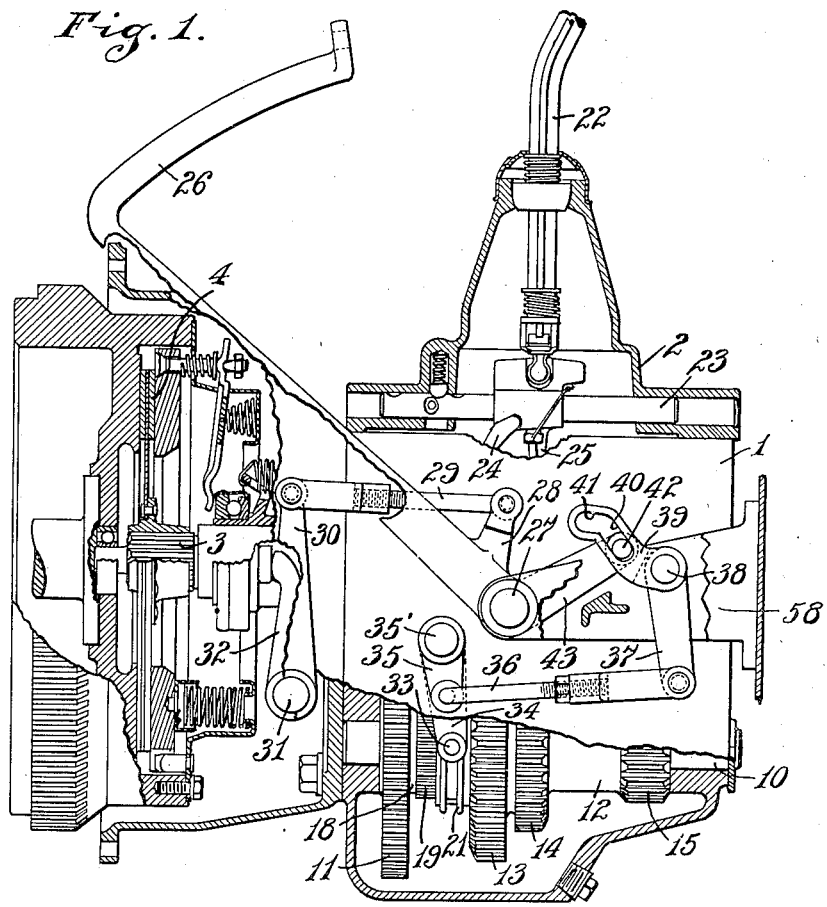
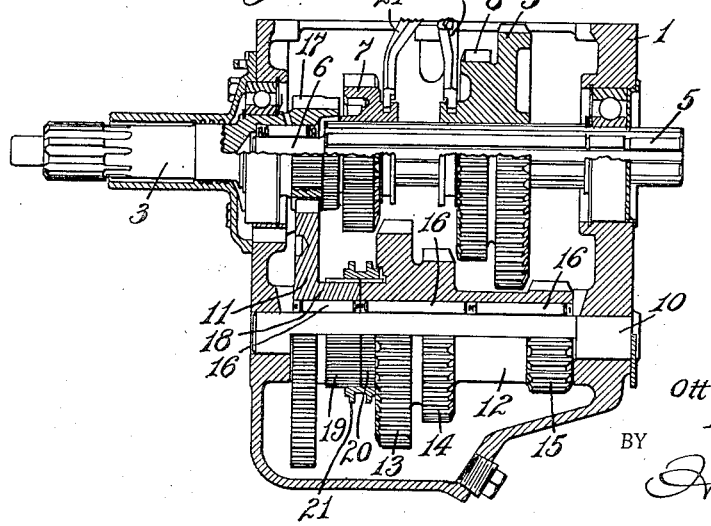
INVENTORS
Otto E. Fishburn and
Palmer Orr,
BY
ATTORNEYS Patented Apr. 20, 1937

2,077,553

UNITED STATES PATENT OFFICE 2,077,553

DOUBLE CLUTCH TRANSMISSION

Otto E. Fishburn and Palmer Orr, Muncie, Ind., assignors, by mesne assignments, to Borg-Warner Corporation, Chicago, Ill., a corporation of Illinois Application December 27, 1932, Serial No. 648,948

1 Claim. (Cl. 192—48)

Our invention relates to improvements in automobile transmissions. It has for one of its objects the provision of means for permitting of an easy shift of gears of transmissions of the sliding gear type and more particularly it has for one of its objects the provision of means for disconnecting certain of the gears of the transmission from driving connection with the driving shaft during the shifting of gears of the transmission from one speed to the other.

For the purpose of disclosing the invention certain embodiments thereof are shown in the accompanying drawing, in which:

Fig. 1 is a side elevation partly in section of a transmission and clutch mechanism embodying the invention; and Fig. 2 is a longitudinal sectional view of the transmission.

In the embodiment illustrated the transmission includes the usual transmission housing 1 having a removable top cover 2. Into this housing extends a drive shaft 3 connected by a suitable engine clutch 4 of any of the commercial types with the engine shaft. This shaft 3 is coaxial with a driven shaft 5 extending into the transmission housing and having its forward end 6 piloted in the rear end of the drive shaft 3.

This shaft 5 is provided with a sliding gear 7 and with a pair of sliding gears 8 and 9, all of which gears are splined on the shaft 5.

Mounted below the shafts 3 and 5 is a countershaft 10 having rotatably mounted thereon a gear 11 and a spindle 12, which spindle is provided with a series of gears 13, 14, and 15, and it will be noted that the gear 11 and spindle 12 are rotatably mounted on rollers 16 interposed therebetween and the shaft 10, whereby these parts rotate on the shaft 10 with a minimum of frictional resistance. The gear 11 meshes with a gear 17 on the driving shaft 3 and these gears are in constant mesh, whereby the gear 11 is constantly driven from the gear 17. The gear 7, for high speed or direct drive, is adapted to be clutched with the gear 17 and for second speed drive the gears 14 and 8 are adapted to be meshed. For low speed drive the gear 9 meshes with the gear 15. For reverse drive an idler gear (not shown) is adapted to be meshed with the gears 9 and 15.

The hub 18 of the gear 11 is extended and is provided with radial clutch teeth 19 and the end of the spindle 12 is likewise provided with a series of radially extending clutch teeth 20. These clutch teeth are adapted to be bridged by a ring clutch member 21 having internal teeth meshing with the teeth 19 and adapted to be meshed when the ring member is slid to the right, looking at Fig. 2, with the teeth 20, whereby when the clutch member 21 is moved into engaging position, the spindle 12 will be driven from the gear 11. However, when the clutch member 21 is slid to the left, to the limit of its movement, looking at Fig. 2, the spindle 12 will be disengaged from driving connection with the gear 11 and likewise disconnected from driving connection with the drive shaft 3, whereby during shifting movement the gears 13, 14, and 15 will be disconnected from any power load and in what may be termed a "floating" condition.

The gears 8 and 9 and 7 are shifted through the instrumentality of a suitable shift lever 22 adapted to engage shift rails 23 and these rails carry forks 24 and 25 engaging an annular groove in the hub of the gear 7 and the hub of the gears 8 and 9.

The engine clutch 4 is operated by the usual clutch pedal 26 which in this instance is mounted on a shaft 27 carried by a bracket member 58. This clutch pedal 26 is provided with an extension or arm 28 connected by an adjustable linkage member 29 with a lever 30 mounted on the shaft 31, arranged in the clutch housing by means of which shaft the lever 30 is connected with the clutch operating arm 32, whereby when the clutch pedal 26 is depressed the engine clutch mechanism will be disengaged.

The sliding clutch ring 21 is operated by a clutch fork engaging in an annular groove in the ring and pivotally connected at 33 with a lever 34 mounted on the interior of the casing on a shaft 35' and connected with a second lever 35 mounted on said shaft on the exterior of the casing 1. This lever 35 is connected by an adjustable link member 36 with a lever arm 37 which is connected with a bell crank lever arm 39. In this instance lever arms 37 and 39 are of integral construction and are pivotally mounted on shaft 38 supported by bracket 58. This arm 39 is provided with a slot 40 which continues into a slot 41 extending at an angle to the slot 40. The purpose of this will appear more fully hereinafter. Operating in the slot 40 is a pin 42 mounted on an arm 43 carried by the shaft 27 and connected with the clutch pedal 26, so that the depression of the clutch pedal 26 will simultaneously rock the arm 43.

In operation, when the clutch pedal 26 is depressed for the purpose of disengaging the clutch 4, this movement of the clutch pedal 26 will rock the arm 43 causing the pin 42 to ride upwardly, looking at Fig. 1, in the slot 40. During the movement of the pin 42 in the slot 40 no movement will be imparted to the lever arm 39. As soon however as the pin 42 engages in the slot portion 41 during the depressing movement of the clutch pedal 26, the arm 39 will be rocked on its stud shaft 38, the free end of the arm raising, and thereby rock the arm 37 which in turn, through the link 36, rocks the arms 35 and 34 thus shifting the clutch ring 21 to the left, looking at Figs. 1 and 2, and disengaging the spindle 12 from the gear 11. It will be noted that the disengaging action of the clutch ring 21 takes place during the disengaging movement of the pedal 26 but only after the engine clutch has been disengaged.

When the clutch pedal 26 is permitted to move to engaging position, the initial movement of this clutch pedal will also, through the rocking action of the pin 42 in the slot 41, move the clutch ring 21 into engaging position. It will however be noted that during the latter part of the engaging movement of the clutch pedal 26 there will be a lost motion connection between this clutch pedal and the clutch ring 21. Therefore it is apparent that the connection between the clutch pedal 26 and the clutch ring 21 is a lost motion connection during the initial disengaging movement of the clutch pedal and a lost motion connection during the end of the engaging movement of the clutch pedal. This lost motion is permitted since slot 40 is constructed in radial relation to the center of shaft 27 and as a result, during movement of pin 42 in slot 40 no movement will be imparted to arm 39. This connection therefore permits of the disengagement of the engine clutch 4 prior to the disengagement of the ring clutch 21 and an engagement of the ring clutch 21 prior to the engagement of the engine clutch 4.

We claim as our invention:

In combination a transmission housing, transmission mechanism in said housing including a variable speed gear train having a drive shaft, a driven shaft and means including a countershaft and a positive acting clutch for connecting and disconnecting said drive shaft and said driven shaft, an engine clutch mounted on said housing having its driven element connected with said drive shaft, a manually operated engine clutch control member pivotally mounted on said transmission housing, an operating connection between said control member and said engine clutch, a rocker pivotally mounted on said housing and having arms extending away from the axis thereof, one arm of said rocker having a slot therein, one portion of said slot extending at an angle to the remaining portion, means carried by said control member adapted to ride in said slot, said slotted rocker arm being so arranged relative to said control member as to cause said rocker to remain stationary during the first part of the engine clutch release movement of said control member and to move angularly upon its axis during the later part of said engine clutch release movement, a rock-shaft mounted on said housing having an arm engaged with said positive acting clutch and a second arm located externally of the housing and an adjustable link interconnecting the extremities of said second rock-shaft arm and the remaining arm of said rocker whereby angular movement of said rocker may cause said rock-shaft to move angularly to actuate said positive clutch.

OTTO E. FISHBURN.
PALMER ORR.